(12) United States Patent
Harrison et al.

(10) Patent No.: US 8,415,402 B2
(45) Date of Patent: Apr. 9, 2013

(54) SEPARATING DEVULCANIZED RUBBER

(75) Inventors: Brian Harrison, Kanata (CA); Hurdon Hooper, Fredericton (CA); Ross Gilders, Fredericton (CA); Leo Cheung, Lincoln (CA); Matthew Ness, Fredericton (CA)

(73) Assignee: Rubreco Inc., Fredericton (CA)

( * ) Notice: Subject to any disclaimer, the term of this patent is extended or adjusted under 35 U.S.C. 154(b) by 304 days.

(21) Appl. No.: 12/608,703

(22) Filed: Oct. 29, 2009

(65) Prior Publication Data

US 2010/0137462 A1 Jun. 3, 2010

Related U.S. Application Data

(60) Provisional application No. 61/110,279, filed on Oct. 31, 2008.

(51) Int. Cl.
*C08J 11/04* (2006.01)

(52) U.S. Cl.
USPC ............... 521/41; 521/40; 528/480; 528/491; 528/501; 528/502 R; 528/502 A; 422/248; 422/255; 422/261; 422/292; 422/600; 422/601; 422/608; 422/616; 422/617; 210/749

(58) Field of Classification Search ............... 521/40, 521/40.5, 41, 43.5, 44, 44.5, 45; 528/480, 528/481, 489, 491, 493, 494, 495, 496, 497, 528/498, 499, 501, 502 R, 502 A, 502 C, 528/502 D, 502 E, 502 F, 503; 210/749, 210/752, 761; 422/243, 255, 292, 600, 601, 422/608, 616, 617, 261

See application file for complete search history.

(56) References Cited

U.S. PATENT DOCUMENTS 7,166,658 B2 1/2007 Harrison et al.
2004/0214906 A1 10/2004 Harrison et al.

FOREIGN PATENT DOCUMENTS

CA 2426253 A1 10/2004
CA 2441713 A1 10/2004

*Primary Examiner* — Frances Tischler
(74) *Attorney, Agent, or Firm* — Pearne & Gordon LLP

(57) ABSTRACT

A method for separating a polymer from carbon black in devulcanized rubber, the method comprising steps of inserting devulcanized rubber into a bath of a solvent, dissolving a polymer out of the devulcanized rubber and into a solution of the solvent and the polymer, removing the solution from the bath without disturbing an un-dissolved residue comprising carbon black, and recovering the un-dissolved residue.

9 Claims, 5 Drawing Sheets

SEPARATING DEVULCANIZED RUBBER

FIELD OF INVENTION

The present invention relates to the separation of devulcanized rubber and in particular to the separation of carbon black from polymer in devulcanized rubber.

BACKGROUND OF THE INVENTION

Vulcanization is a chemical process which improves the bulk properties of rubber for use in many applications. Vulcanized rubber is used in vast quantities in a myriad of products including automobile tires, shoe soles, and hoses. However, recycling vulcanized rubber to obtain useful materials is often a difficult and time consuming process.

The problem of efficiently recycling vulcanized rubber to produce raw materials suitable for reuse in manufacturing or other applications has proven to be difficult to solve. The process of recycling this material typically requires a devulcanization which, as the name suggests, attempts with varying degrees of success to reverse the effects of vulcanization.

Once devulcanized, the material may be further broken down into useful subcomponents such as carbon black and polymers such as polyisoprene, polybutadiene, styrene-butadiene, isoprene-butadiene, styrene-isoprene, styrene-isoprene-butadiene, butadiene acrylonitrile, chloro isobutylene-isoprene, and bromo isobutylene-isoprene. The above list of polymers is not intended to be limiting. The present invention addresses the problem of separating the carbon black component from the polymer component of devulcanized rubber material.

One way to achieve a physical separation between carbon black and polymer in devulcanized material is to dissolve the polymer in a solvent such as toluene. The resulting mixture is typically a suspension of carbon black in a solvent/polymer solution. The problem of separating the carbon black from the polymer becomes one of removing these suspended particles from the solution.

The processing of devulcanized scrap rubber with the use of a solvent is well known in the art. Prior processes have been described where 'moderate sized chunks' of scrap rubber with diameters of up to 6 inches are dissolved in aromatic oil in a stirred reactor under particular pressure and temperature conditions. It is apparent that carbon black particles are distributed throughout the resulting solution in such a 'stirred reactor'.

Centrifuge technology has been used in many previous applications to separate suspended solids from a fluid. The design of a centrifuge required to achieve a desired degree of separation depends on many factors including the type of centrifuge, the properties of the particles to be separated, and the properties of the surrounding fluid. Carbon black particles used in the reinforcement of rubber tend to be quite small compared to the size of particles that typical industrial centrifuges are designed to capture. In practice it is not a simple matter to separate the small size carbon black particles from the polymer/solvent solution in a cost effective manner, with centrifuge technology.

Another common method used to remove suspended solids from a solution is filtration. The use of filters is also not ideal in the present application. Filters that are fine enough to be suitable for the filtration of carbon black also tend to result in a slow separation process if gravity is employed to push the solution through the filter. If pressure or a vacuum is applied to increase the rate of filtration, then carbon black may be pushed through such filters. Another problem with filtration is blinding wherein the filtration rate is dramatically reduced by a build-up of material on the filter. This problem is exacerbated by increasing polymer molecular weight and the presence of both carbon black and polymer in the mixture to be filtered. The polymer tends to become bound-up with carbon black deposited on the filter creating an impenetrable layer.

Pre-coating the filter is a method that attempts to improve the efficiency of filtration by pre-treating the filter surface with a layer of the material to be filtered. However, in removing the small carbon black particles that are suspended in the polymer/solvent solution, the cake formed on the filter for the pre-coating can rapidly lead to binding of the polymer/solvent solution and carbon black.

Emulsification techniques whereby a slurry of suspended carbon black particles in a solution of polymer and solvent is mixed with an immiscible fluid such as water have also proven to be ineffective for the purpose of separating carbon black into a separate phase from a polymer/solvent solution.

A need exists for an improved method of separating carbon black from the polymer of devulcanized rubber that is both cost efficient and effective in separating these components.

SUMMARY OF THE INVENTION

In accordance with one aspect of the disclosure there is provided a method of separating components of devulcanized rubber. The method comprises bringing the devulcanized rubber into contact with a solvent without agitating the solvent, allowing the solvent to dissolve polymer from the devulcanized rubber, allowing carbon black particles to remain unsuspended in the polymer-solvent solution, removing the polymer-solvent solution without disturbing the un-suspended carbon black particles, and removing the carbon black.

In accordance with a further aspect of the disclosure there is provided a method of continuously separating components of devulcanized rubber. The method comprises placing the devulcanized rubber into a plurality of reaction trays, each having an inlet port located on a top of the reaction tray, an outlet port located on a bottom of the reaction tray and a reaction section located between the inlet port and the outlet port, coupling the plurality of reaction trays together to form a first reaction stack by connecting the outlet port of a respective reaction tray to the inlet port of another respective reaction tray, introducing a solvent into the inlet port of a reaction tray of the first reaction stack, allowing the solvent to pass through the plurality of reaction trays of the first reaction stack, coupling a second plurality of reaction trays together to form a second reaction stack, coupling the inlet port of a reaction tray of the second reaction stack to the outlet port of a reaction tray of the first reaction stack, and introducing the polymer-solvent solution into the second reaction stack from the outlet port of the reaction tray of the first reaction stack.

In accordance with a still further aspect of the disclosure there is provided a reaction system for continuously separating components of devulcanized rubber. The reaction system comprises a first reaction stack for holding a first portion of the devulcanized rubber to be separated, the first reaction stack comprising an inlet port located at a top section of the first reaction stack and an outlet port located at a bottom section of the first reaction stack, the inlet port of the first reaction stack for receiving a solvent for extracting polymer from the first portion of the devulcanized rubber, and a second reaction stack for holding a second portion of the devulcanized rubber to be separated, the second reaction comprising an inlet port located at a top section of the second reaction stack and an outlet port located at a bottom section of the second reaction stack, the inlet port of the second reaction stack coupled to the outlet port of the first reaction stack and for receiving the polymer/solvent solution from the first reaction stack.

BRIEF DESCRIPTION OF THE DRAWINGS

These and other features of the invention will become more apparent from the following description in which reference is made to the appended drawings wherein.

DETAILED DESCRIPTION

The current description provides a method that acts on devulcanized rubber to dissolve polymer from the devulcanized rubber. The process dissolves the polymer in a solvent and separates the polymer/solvent solution from the carbon black particles of the devulcanized rubber. In an illustrative embodiment described herein, chips of devulcanized rubber with a diameter of about 1 centimeter or less, a carbon black content of less than 50%, and with a specific gravity around one are used in the method. It will be apparent to persons skilled in the art that a number of variations and modifications can be made to the method described herein without departing from the scope of the invention as defined in the claims.

Many of the problems associated with separating a suspension of carbon black particles from a solution of dissolved polymer and an appropriate solvent such as toluene or xylene are caused by the fine particle size of carbon black particles. A way to overcome many of these problems is to minimize the degree to which the carbon black particles are suspended the mixture.

Figure 1:
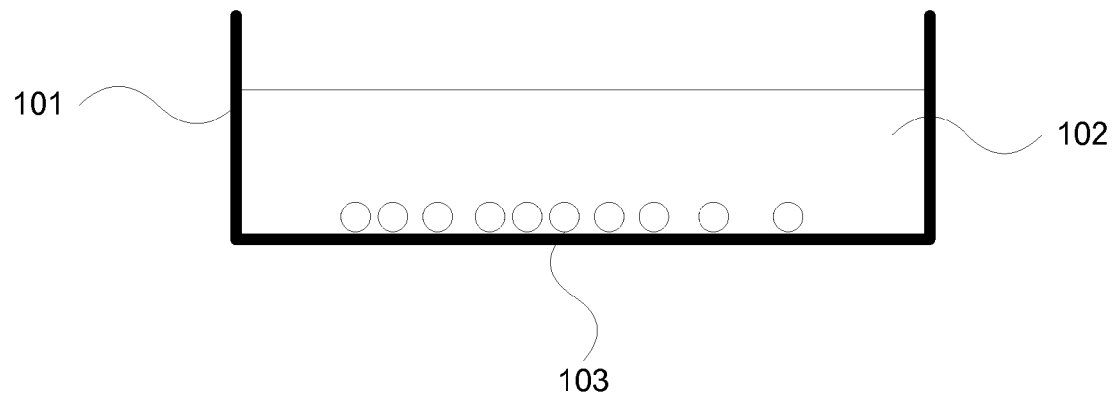
FIG. 1 shows devulcanized rubber particles introduced into a still bath of solvent.

FIG. 1 shows a schematic of a process of separating carbon black particles from polymer of devulcanized rubber. Referring to FIG. 1, when devulcanized rubber particles 103 are placed at the bottom of a still bath of an appropriate solvent 102, carbon black particles will tend to remain at or near the bottom of the bath while dissolved polymer is spread evenly throughout the resulting polymer/solvent solution. The majority of polymer/solvent solution may then be removed with suction, a drain positioned above the layer containing the carbon black, a controlled flow, or other means without also removing carbon black. The devulcanized rubber 103 must not be buoyant in the selected solvent 102 or polymer/solvent solution.

Devulcanized rubber particles 103 of a relatively small size compared to the solvent bath volume are introduced into the bath 101 in a way that minimizes the agitation of solvent 102 around the devulcanized rubber chips 103 and therefore reduces the chance that carbon black particles are washed off of the surface of the rubber chips 103 and become suspended in the polymer/solvent solution. Conversely, solvent should not be poured over the devulcanized rubber particles 103 because of the resulting agitation and dispersal of carbon black particles.

Processes in accordance with the method described herein may be designed to be performed in a stationary batch style, wherein devulcanized rubber particles 103 sit in a bath 101 until the dissolving is complete, or alternatively in a continuous process. Continuous processes may comprise the use of a conveyor belt, the insertion of a shallow reaction tray, or other mechanical means. If a continuous process is employed a flow counter to the direction of the devulcanized rubber particle motion may be introduced to the solvent. One of the advantages of using the continuous process, which introduces new devulcanized rubber at the end of the process line, is that the new devulcanized rubber is introduced into solvent that is saturated or semi saturated with polymer. This reduces the amount of polymer that will be extracted from the new devulcanized rubber as it is being introduced into the solvent and as a result the amount of carbon black particles that will be released. The introduction of the new devulcanized rubber into the process may agitate the solvent and cause carbon black particles to become suspended in the solvent. Since the polymer/solvent solution is already saturated or partially saturated with polymer, very little polymer will be extracted and so little carbon black particles will be released and become suspended in the polymer/solvent solution. The counter-flow ensures that the residue exiting the continuous process is in contact with clean solvent which maximizes the degree of polymer extraction. In either a continuous or a stationary process the solvent bath 102 is not stirred or agitated during the dissolving process to allow the carbon black particles to remain un-suspended in the polymer/solvent solution. After the dissolving process is completed, the carbon black particles and residual polymer (if any) remain at the bottom of the solvent bath 101 or, if a continuous process is used, on the conveying device. The majority of the polymer/solvent bath solution may then be removed with minimal carbon black particles suspended within the polymer/solvent solution.

Generally the temperature of the solvent bath may be elevated to increase the rate at which the polymer dissolves into the solvent where appropriate depending on factors such as the particular polymer to be dissolved. Convection currents may result from heating the polymer/solvent solution, which may result in the agitation of the polymer/solvent solution and suspension of the carbon black particles, and so should be minimized In another illustrative embodiment of a stationary batch process, water or an aqueous solution 202 with a specific gravity around one may be introduced to the dissolving bath. Appropriate solvents such as those discussed above float above such liquids. The specific gravity of devulcanized rubber particles 103 may vary but is typically around one. Water or an aqueous solution 202 may be chosen to match the characteristics of the devulcanized rubber 103 and solvent 102 such that both the solvent 102 and the devulcanized rubber 103 are supported by a layer of water or aqueous solution 202 at the bottom of the bath container 201. An advantage of this arrangement is that the carbon black particles and polymer residue tends to pool away from the edges of the solvent bath vessel 201 which facilitates, among other things, the transportation of the wet carbon black and polymer residue. The water or aqueous solution 202 forms a platform suitable for moving the extracted carbon black to other vessels. The resulting carbon black, polymer, and water or aqueous solution system may be transported like a liquid rather than requiring a method of removing the carbon black as an unsupported solid.

Figure 2:
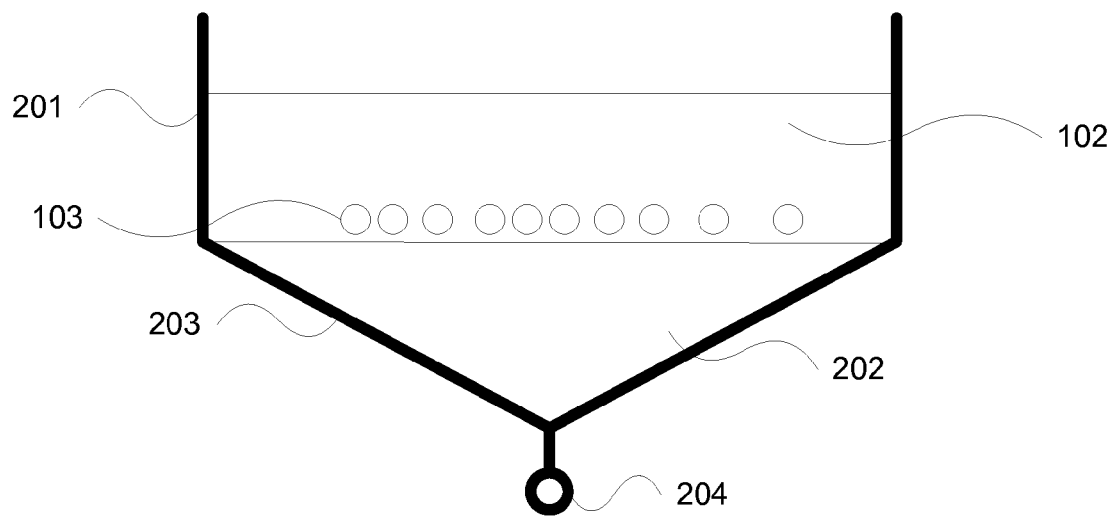
FIG. 2 shows a container with a separatory funnel in which a solvent floats above a water or aqueous layer with devulcanized rubber particles resting on the water or aqueous layer in accordance with an embodiment of the present invention.
Figure 3:
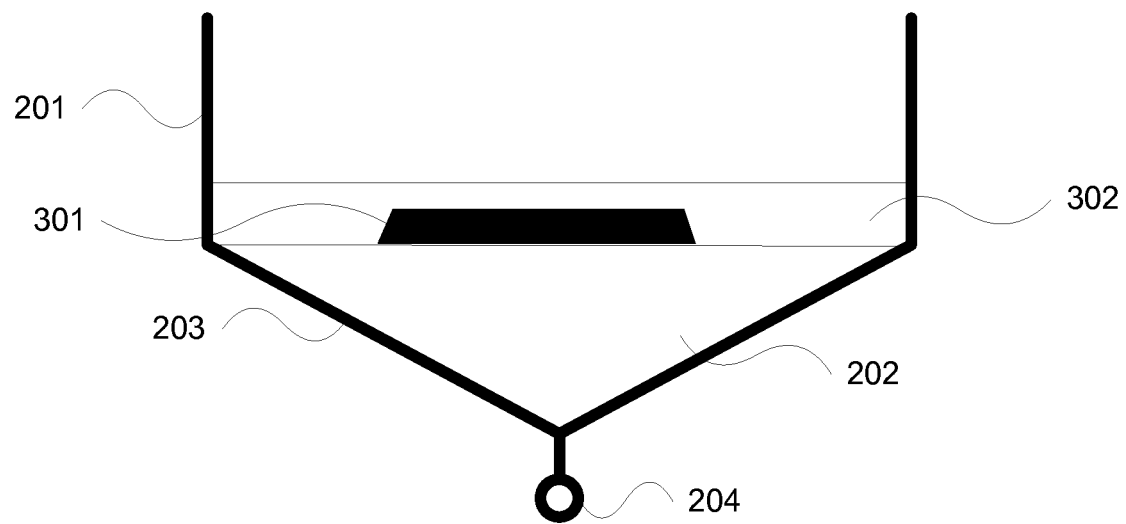
FIG. 3 shows a container with a separatory funnel in which a solution of solvent and dissolved polymer floats above a water or aqueous layer which supports wet carbon black and un-dissolved polymer residue if any.
Figure 4:
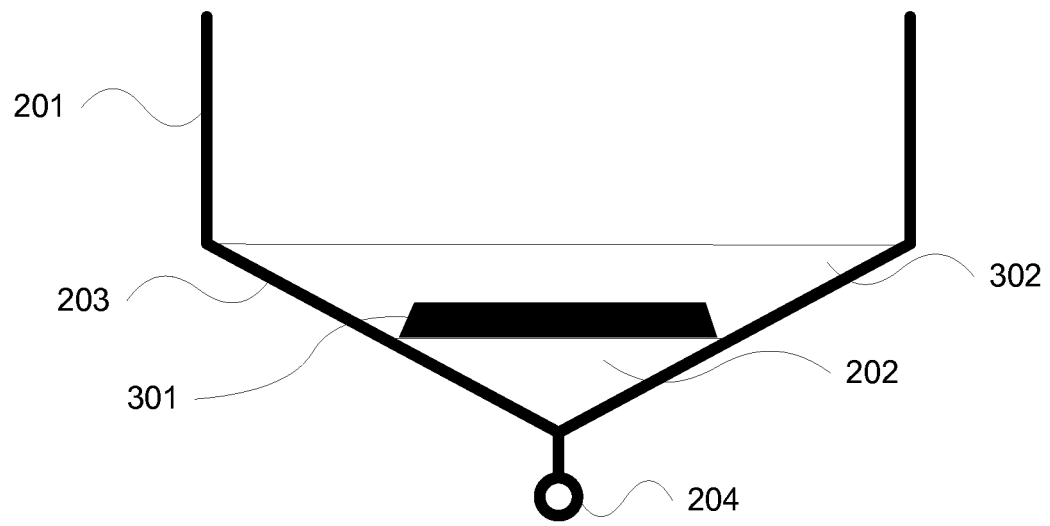
FIG. 4 shows a container with a separatory funnel in which the volume of a water or aqueous layer has been reduced in order to increase the relative depth of remaining polymer/solvent solution in order to facilitate the extraction of remaining polymer/solvent solution.

FIGS. 2, 3 and 4 depict schematics of an illustrative batch process. The devulcanized rubber 103 is supported on a water or aqueous layer 202 in a vessel 201 which includes a separatory funnel 203. The dissolving process may be performed while the water or aqueous layer 202 has a sufficient volume such that it provides a maximum surface area. Maximizing the surface area of the water or aqueous layer 202 ensures maximum exposure of the devulcanized rubber particles 103 to the solvent 102.

As depicted in FIG. 3, after the layer of polymer/solvent solution 302 has been removed, for example by suction or other means, the un-suspended carbon black particles 301 and other residue rests below a shallow layer of additional polymer/solvent solution 302. It will be appreciated that although the devulcanized rubber particles 103 and the carbon black particles 301 are described as being separate, that there is a continuous transition between the devulcanized rubber and remaining carbon black 301 as additional polymer is extracted by the solvent.

As depicted in FIG. 4, an amount of water or the aqueous solution 202 may then be removed through a valve 204 or by other means in order to increase the depth of the polymer/solvent solution 302 in the funnel 203. The removal of additional polymer/solvent solution 302 is facilitated by the increase in depth of the polymer/solvent solution within the funnel 203.

It may be desirable in some cases to allow the carbon black residue 301 to fall through an aqueous layer 202 at the bottom of the solvent bath vessel 201. Depending on the specific gravity of the carbon black residue 301 and the aqueous layer 202 on which the dissolving process progressed, the specific gravity of the aqueous layer 202 may be adjusted by varying the concentration of dissolved solute in the aqueous solution to a degree that allows the carbon black residue 301 to sink through. Conversely, the specific gravity of the aqueous layer 202 may be changed during the dissolving process to ensure that the devulcanized rubber particles 103 and carbon black residue 301 is supported throughout the dissolving process. Alternatively a surfactant may be used to allow the carbon black residue 301 to fall through the water or aqueous solution after first extracting polymer/solvent solution 302 to avoid remixing the separated components.

In versions of the process that do not initially use a water or aqueous layer, further processing of the extracted carbon black and polymer/solvent residue is often possible. These processes include a stationary batch process without a supporting water or aqueous layer or a continuous process wherein the devulcanized rubber particles travel through a solvent bath. Carbon black residue produced from these processes is typically contained within a shallow layer of polymer/solvent solution or solvent only. Where the specific gravity of the carbon black residue is greater than water or an appropriate aqueous solution, water or the aqueous solution may be carefully added to form a layer between the residual polymer/solvent solution and the carbon black which further facilitates the removal of the remaining polymer/solvent solution from the carbon black.

Figure 5:
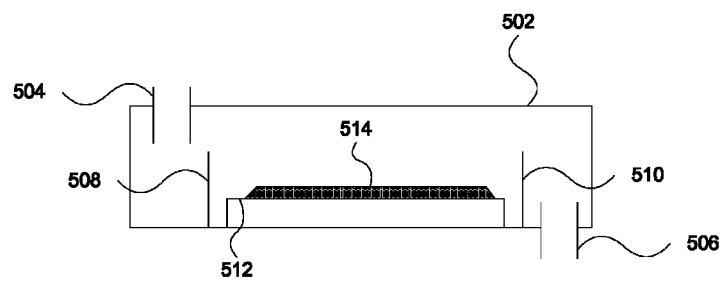
FIG. 5 shows an illustrative reaction tray for use in separating carbon black particles from a polymer/solvent solution.

FIG. 5 shows an illustrative reaction tray for use in separating carbon black particles from a polymer/solvent solution. The reaction tray 502 may be used in the processes described above to support the devulcanized rubber. The devulcanized rubber may be introduced into the reaction tray as chips of devulcanized rubber as described above. Alternatively the devulcanized rubber may be formed into sheets as depicted in FIG. 5. The reaction tray 502 comprises a housing with an inlet port 504 and an outlet port 506. As depicted in FIG. 5, the inlet port 504 and the outlet port 506 may be located on opposite sides of the reaction tray 502. The inlet port 504 allows solvent to be introduced into the reaction tray, and the outlet port 506 allows the polymer/solvent solution to be removed from the reaction tray 502. The reaction tray may include an inlet baffle 508 located near the inlet port 504 and an outlet baffle 510 located near the outlet port 506. The inlet baffle 508 and the outlet baffle 510 can help control the flow of the solvent over the devulcanized rubber 514 to reduce the agitation of the solvent prior to contacting the devulcanized rubber 514.

As depicted in FIG. 5, the devulcanized rubber 514 is located in a reaction section of the reaction tray. The devulcanized rubber 514, whether in sheet, chip or other forms, may be supported on a platform 512 located in the reaction section of the reaction tray. The platform 512 allows solvent to come into contact with both the upper and lower surfaces of the devulcanized rubber 514. Although the platform 512 is depicted in FIG. 5, it is possible to support the devulcanized rubber 514 on the bottom surface of the reaction tray. Alternatively, grooves or channels may be formed in the bottom surface of the reaction tray 502 into which chips or sheets of devulcanized rubber may be inserted, or packed. The use of the grooves or channels may help to reduce the amount of agitation of the solvent passing over the devulcanized rubber.

The reaction tray 502 may be used in a batch process, in which the solvent is introduced into the reaction tray through the inlet port 504. The outlet port 506 may be closed to allow the reaction tray to fill with the solvent. After a period of time has passed sufficiently long enough to extract the desired amount of polymer from the devulcanized rubber 514. After the reaction time has elapsed the outlet port 506 may be opened in order to remove the solvent with the dissolved polymer extracted from the devulcanized rubber. Alternatively, a pump, vacuum, siphon or suction to remove the polymer/solvent solution from the reaction tray though the inlet port 504.

Although not shown in FIG. 5, a porous material, such as gauze or similar material may be placed over the devulcanized rubber in the reaction tray 502. The porous material may help to further prevent any carbon black particles from becoming suspended in the polymer/solvent solution. Since the material is porous, it allows to still be extracted from the devulcanized rubber 514 by the solvent.

Figure 6:
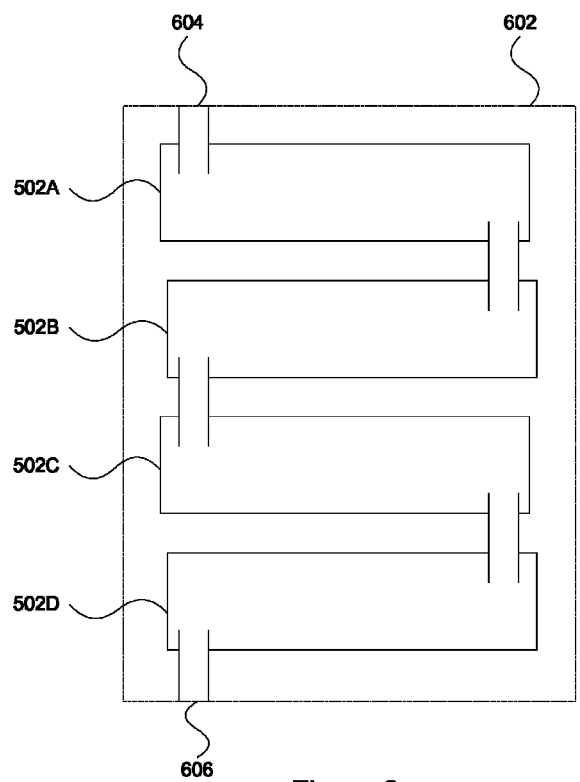
FIG. 6 shows an illustrative reaction stack for use in separating carbon black particles from a polymer/solvent solution.

FIG. 6 shows an illustrative reaction stack for use in separating carbon black particles from a polymer/solvent solution. Multiple reaction trays 502A-D as described above with reference to FIG. 5 may be used together to increase the amount of devulcanized rubber that can be processed at one time. As depicted in FIG. 6, four reaction trays 502A-D are coupled together to form a reaction stack 602. Although four reaction trays 502A-D are depicted as forming the reaction stack 602, it will be appreciated that more or fewer reaction trays can be coupled together to form the reaction stack 602. The reaction trays are coupled together such that the outlet port of one reaction tray is connected to the inlet port of the subsequent reaction tray. The inlet port of the first reaction tray 502A may be used as the inlet port 604 of the reaction stack. The outlet port of the last reaction tray 502D may be used as the outlet port of the reaction stack 602.

As solvent is introduced into the inlet port 602 it passes over the devulcanized rubber in the reaction trays 502A-D. As the solvent passes over the devulcanized rubber, additional polymer is extracted. As such, the polymer/solvent solution becomes more concentrated with polymer as it passes from the first reaction tray 502A to the last reaction tray 502D. As a result the devulcanized rubber in the last reaction tray may require a longer processing time than the first reaction tray, or alternatively less polymer may be extracted from the last reaction tray 502D than the first reaction tray 502A.

Figure 7:
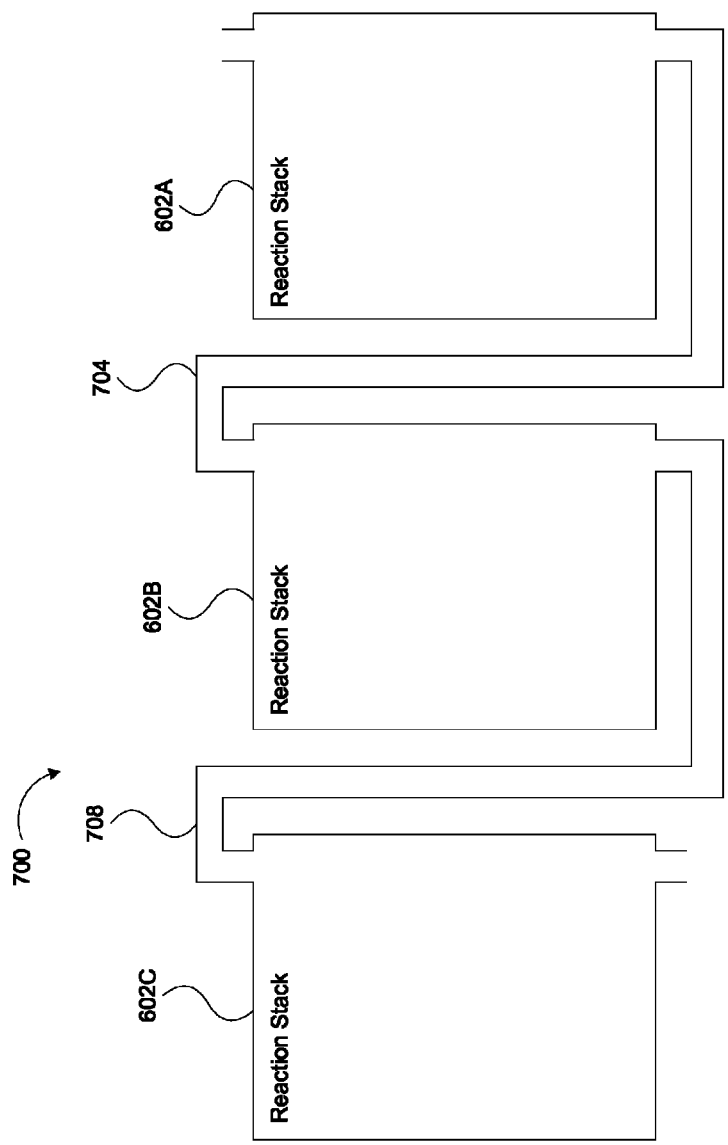
FIG. 7 shows an illustrative embodiment for use in the continuous separation of carbon black particles from a poly/solvent solution.

FIG. 7 shows an illustrative embodiment for use in the continuous separation of carbon black particles from a polymer/solvent solution. The reaction system 700 may comprise a plurality of reaction stacks 602A-C coupled together. The reaction stack 602A is coupled to the reaction stack 602B through a pipe 704. The reaction stack 602B is coupled to the reaction stack 602C through a pipe 706. Solvent may be introduced into the reaction system 700 at the inlet port of the first reaction stack 602A. The solvent may pass through the reaction stack 602A under the force of gravity to the outlet port of the first reaction stack 602A. The polymer/solvent solution may be pumped through the pipe 704 to the inlet port of the second reaction stack 602B. The polymer/solvent solution may then pass through the second reaction stack 602B from the inlet port to the outlet port, extracting additional polymer from the devulcanized rubber. The polymer/solvent solution is then pumped from the outlet port of the second reaction stack 602B to the inlet of the third reaction stack 602C through a pipe 706. The polymer/solvent solution then extracts polymer from the devulcanized rubber in the third reaction stack 602C.

The reaction system 700 may be used to provide a semi-continuous process of separating polymer from carbon black of devulcanized rubber. The process can be run continuously by disconnecting the first reaction stack 602A and coupling the solvent to the inlet port of the second reaction stack 602B. An additional reaction stack can be coupled to the outlet port of the reaction stack 602C to process additional devulcanized rubber. This process can be repeated so that additional reaction stacks are added into the reaction system as the oldest reaction stacks are removed.

As the polymer/solvent solution passes from the first reaction stack towards the last reaction stack, the polymer/solvent solution becomes more concentrated with extracted polymer. The solvent is introduced to the reaction stack that has been in the reaction system for the longest period of time. Advantageously, this allows for progressively more polymer to be extracted from the devulcanized rubber as the reaction stack passes through the reaction system. This also allows for less polymer to be extracted from the devulcanized rubber that has just been added to the reaction system, which will reduce the amount of carbon black particles that could be suspended in the polymer/solvent solution. This is advantageous since the introduction of the devulcanized rubber into the reaction system may cause the polymer solvent solution to become agitated, causing any free carbon black particles to become suspended.

Figure 8:
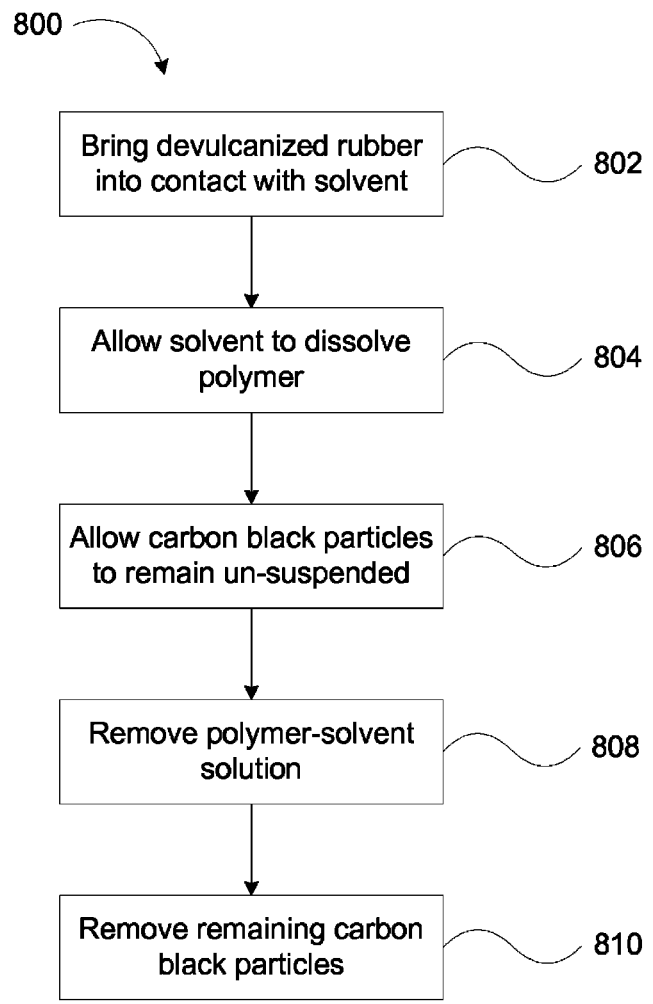
FIG. 8 shows a flow chart of an illustrative method of separating carbon black particles from a polymer/solvent solution.

FIG. 8 shows a flow chart of an illustrative method 800 of separating carbon black particles from a polymer/solvent solution. The method 800 begins with bringing the devulcanized rubber into contact with the solvent (802) without agitating the solvent. By reducing the agitation of the solvent, The solvent is allowed to dissolve the polymer of the devulcanized rubber (804). By reducing the agitation of the solvent, the carbon black particles are allowed to remain un-suspended in the polymer/solvent solution (806) after the polymer is extracted from the devulcanized rubber. The polymer/solvent solution is the removed (808), which may then be further processed isolate and separate the polymer. The remaining carbon black particles, which remain are then removed (810).

The extraction and separation process was tested. In an illustrative test hot toluene (70° C.) was added to a heated ceramic dish with three steal channels in it until the channels were completely submerged in the toluene (350 mL). Rubber chunks were then placed in the channels after the toluene was added. A heated cover was placed on top of the ceramic dish to prevent the toluene from evaporating off. A peristaltic pump was then used with viton masterflex tubing to pump hot toluene into the test system. Another peristaltic pump was used to pump solution out of the system into a collection beaker. The test system was run for 480 min sampling every 30 min. After 480 min the remaining solvent solution in the system was drained into a beaker and the carbon black was removed from the channels and put into a beaker. Everything was dried in an oven at 115° C. and their masses were recorded. From a 6.24 g sample, 3.27 g (52.4%) of polymer was collected and 2.90 g (46.5%) of carbon black was collected. Pyrolysis of the carbon black residue resulted in 76.7% carbon black.

Although the figures and description have described many specifics for the purposes of illustration, anyone of ordinary skill in the art will appreciate that many variations and alterations to the described details are within the scope of the present disclosure. Accordingly, the described embodiments are set forth without any loss of generality to, and without imposing limitations upon, the claimed subject matter. The scope of the invention is therefore intended to be limited solely by the scope of the appended claims.

What is claimed is:

1. A method of separating a polymer component from carbon black particles of devulcanized rubber, the method comprising:
    bringing the devulcanized rubber and a solvent into contact with each other;
    allowing the solvent to dissolve a portion of the polymer component from the devulcanized rubber to form a polymer-solvent solution without agitating the solvent to prevent the carbon black particles from becoming suspended in the polymer-solvent solution;
    removing the polymer-solvent solution without disturbing the un-suspended carbon black particles; and
    removing the carbon black particles.

2. The method of claim 1, wherein the step of bringing the devulcanized rubber and solvent into contact comprises one of:
    introducing chips of devulcanized rubber into a shallow bath of solvent;
    placing chips of devulcanized rubber into channels formed in a channelled-reaction chamber and introducing the solvent into the channelled-reaction chamber; or
    placing a sheet of devulcanized rubber into a reaction chamber and introducing the solvent into the reaction chamber.

3. The method of claim 2, wherein introducing the solvent into the channelled-reaction chamber or the reaction chamber comprises introducing the solvent through an inlet offset from the devulcanized rubber.

4. A method of separating a polymer component from carbon black particles of devulcanized rubber, the method comprising:

bringing the devulcanized rubber and a solvent into contact with each other;

allowing the solvent to dissolve a portion of the polymer component from the devulcanized rubber without agitating the solvent to form a polymer-solvent solution and causing the carbon black particles to remain un-suspended in the polymer-solvent solution;

removing the polymer-solvent solution without disturbing the un-suspended carbon black particles; and removing the carbon black particles, wherein bringing the devulcanized rubber and solvent into contact comprises:

placing a sheet of devulcanized rubber on top of a supporting liquid in a reaction vessel having a funnel shaped bottom, the supporting liquid having a specific gravity greater than the specific gravity of the devulcanized rubber and the specific gravity of the solvent; and introducing the solvent on top of the supporting liquid.

5. The method of claim 4, wherein the removing the polymer-solvent solution comprises:

removing a portion of the polymer-solvent solution;

removing a portion of the supporting liquid through a port in the bottom of the funnel shaped reaction vessel, to increase the depth of the remaining polymer-solvent solution; and removing a further portion of the polymer-solvent solution.

6. The method of claim 1, wherein the step of bringing the devulcanized rubber and solvent into contact comprises:

placing the devulcanized rubber into a reaction tray having an inlet port located on a top of the reaction tray, an outlet port located on a bottom of the reaction tray and a reaction section located between the inlet port and the outlet port;

introducing the solvent into the reaction tray through the inlet port; and allowing the solvent to flow over the devulcanized rubber in the reaction section towards the outlet port.

7. The method of claim 6, wherein placing the devulcanized rubber into the reaction tray comprises one of:

placing chips of devulcanized rubber into a channel in the reaction section of the reaction tray; or placing a sheet of devulcanized rubber into the reaction section of the reaction tray.

8. The method of claim 6, wherein removing the polymer-solvent solution without disturbing the un-suspended carbon black particles comprises recovering the polymer-solvent solution from the outlet port; and wherein removing the carbon black comprises removing the carbon black remaining in the reaction tray after removing the polymer-solvent solution.

9. The method of claim 6, further comprising:

placing the devulcanized rubber into a plurality of reaction trays, each having an inlet port located on a top of the reaction tray, an outlet port located on a bottom of the reaction tray and a reaction section located between the inlet port and the outlet port; and coupling the plurality of reaction trays together by connecting the outlet port of a respective reaction tray to the inlet port of another respective reaction tray.

* * * * *